United States Patent [19]
Cherbettchian

[11] Patent Number: 6,006,639
[45] Date of Patent: Dec. 28, 1999

[54] SOLDER PLACEMENT APPARATUS AND METHOD

[75] Inventor: Agop H. Cherbettchian, Santa Monica, Calif.

[73] Assignee: Litton Systems, Inc., Woodland Hills, Calif.

[21] Appl. No.: 09/018,770

[22] Filed: Feb. 4, 1998

[51] Int. Cl.[6] .................................................. B21F 15/06
[52] U.S. Cl. .................................. 83/277; 83/99; 83/649
[58] Field of Search ................................ 83/99, 151, 649, 83/907, 929.2, 950, 206, 227, 232, 233, 277; 285/31; 29/402.01

[56] References Cited

U.S. PATENT DOCUMENTS

| | | | |
|---|---|---|---|
| 2,877,845 | 3/1959 | Cameron | 83/99 |
| 3,701,301 | 10/1972 | Gudmestad | 83/277 |
| 3,927,590 | 12/1975 | Gudmestad et al. | 83/277 |
| 4,457,195 | 7/1984 | Brooks | 83/649 |
| 4,581,809 | 4/1986 | Soth | 83/929.2 |
| 4,596,174 | 6/1986 | LaFleur | 83/277 |
| 4,638,904 | 1/1987 | Tandar et al. | 83/277 |
| 4,722,127 | 2/1988 | Pujol | 29/157 |
| 4,879,934 | 11/1989 | Adlon et al. | 83/950 |
| 5,172,940 | 12/1992 | Usui et al. | 285/31 |
| 5,357,072 | 10/1994 | Garwick | 83/950 |

*Primary Examiner*—Kenneth E. Peterson
*Assistant Examiner*—Gyounghyun Bae
*Attorney, Agent, or Firm*—Lynn & Lynn

[57] ABSTRACT

A solder placement device forms a selected length of a solder wire and delivers it to a pigtailing station where an optical fiber and a crystal diode are to be optically coupled together. The solder placement device includes casing that contains a plunger arranged for reciprocal movement along an axis in the casing. A solder input tube guides solder from a supply spool to a retainer inside the casing. The retainer is mounted to the plunger and arranged to allow unidirectional movement of the wire along the axis such that movement of the plunger toward the output end of the apparatus pulls the solder wire along with the plunger. When the direction of the plunger reverses, the retainer slides along the solder wire, and the apparatus resets to pull in another segment of the solder wire. A cutting mechanism is actuated by movement of the plunger along the axis to cut off a piece of solder of the selected length. An output tube has a first end mounted to the casing adjacent the cutting mechanism. The output tube is arranged to receive the cut off piece of wire so that compressed air blows it to the soldering station.

6 Claims, 5 Drawing Sheets

SOLDER PLACEMENT APPARATUS AND METHOD

BACKGROUND OF THE INVENTION

This invention relates generally to apparatus and methods for fiber optic pigtails. This invention relates particularly to apparatus for cutting a solder wire to a selected length and placing it in position for mounting an optical fiber on a substrate in proximity to a light source or a photodetector.

The current industry practice for optical coupling an optical fiber and a crystal diode is to use solder preforms. Manufacturing and positioning solder preforms is expensive and time-consuming. There is a need in the art for an improved technique for delivering a predetermined amount of solder to a pigtailing station where an optical fiber and a crystal diode are to be coupled together.

SUMMARY OF THE INVENTION

The present invention overcomes the deficiencies of the prior art by providing an apparatus and method for forming a selected length of a solder wire and delivering it to a pigtailing station where an optical fiber and a crystal diode are to be optically coupled together. The apparatus according to the present invention comprises a casing that contains a plunger arranged for reciprocal movement along an axis in the casing. A solder input tube guides solder from a supply spool to a retainer inside the casing.

The retainer is mounted to the plunger and arranged to allow unidirectional movement of the wire along the axis such that movement of the plunger toward the output end of the apparatus pulls the solder wire along with the plunger. When the direction of the plunger reverses, the retainer slides along the solder wire, and the apparatus resets to pull in another segment of the solder wire.

A cutting mechanism is mounted in the casing displaced along the axis from the retainer. The cutting mechanism is actuated by movement of the plunger along the axis to cut off a piece of solder of the selected length. An output tube has a first end mounted to the casing adjacent the cutting mechanism. The output tube is arranged to receive the cut off piece of wire so that compressed air blows it to the soldering station.

The retainer preferably comprises a leaf spring mounted to the plunger inside the casing. The leaf spring has a central passage arranged along the axis. Edges of the passage are arranged to engage the wire to permit movement of the wire toward the cutting mechanism and to resist movement of the wire away from the cutting mechanism.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
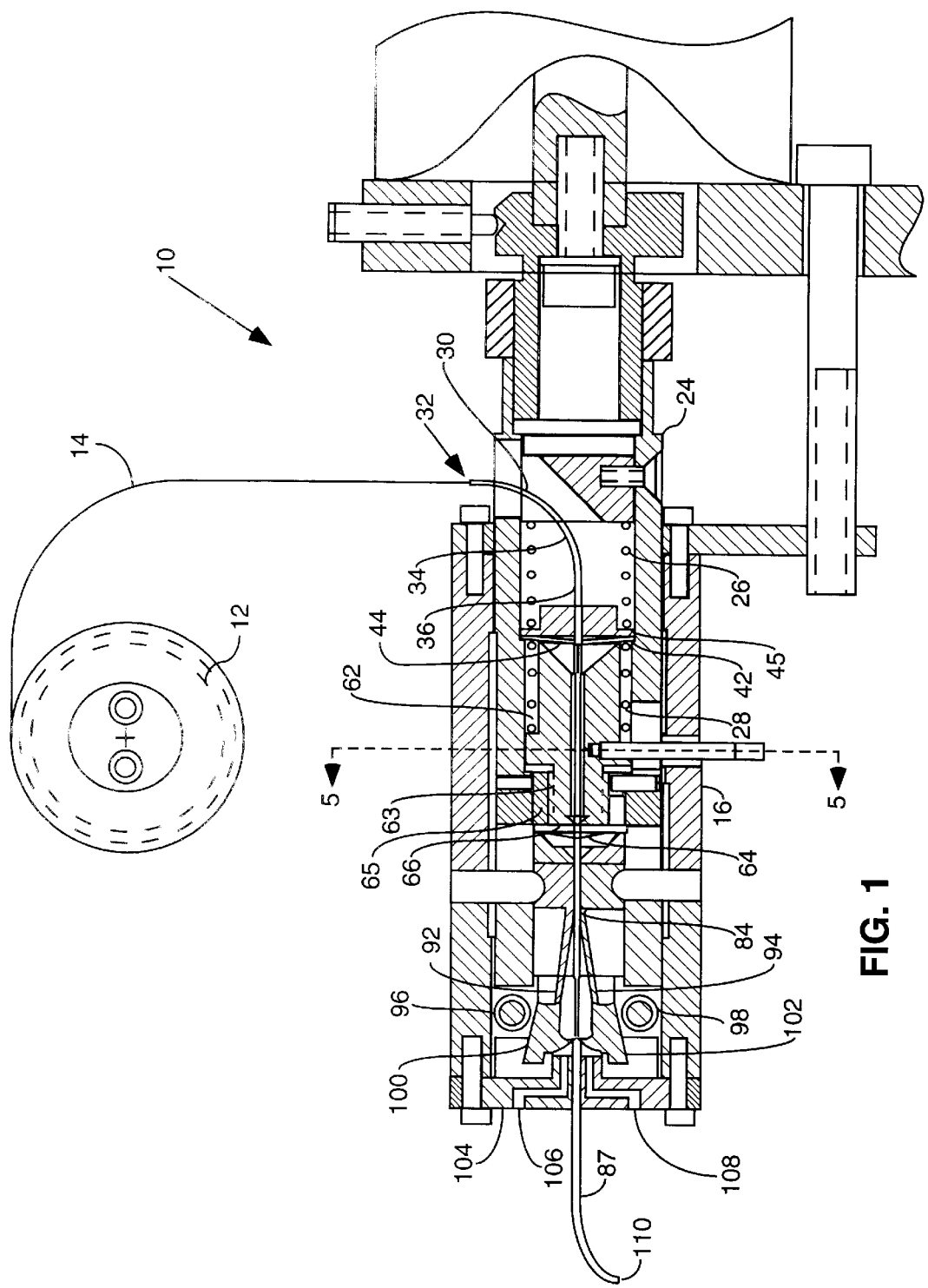
FIG. 1 is a cross sectional view of a solder placement system according to the present invention.

Referring to FIG. 1, a solder placement device 10 according to the present invention includes a spool 12 upon which a supply of solder 14 is wound. The solder placement device 10 comprises a generally cylindrical hollow casing 16, apparatus for drawing the solder 14 into the casing 16, apparatus for measuring a length of the solder 14 to be cut, apparatus for cutting the solder 14, and apparatus for moving a cut solder piece 18 shown in FIG. 6 a location suitable for application to an optical fiber 20 shown in FIG. 6 and a laser diode 22 that are to be optically coupled together.

The apparatus for drawing the solder 14 into the placement device 10 includes a plunger 24 placed in the casing in axial alignment with the casing 16. The plunger 24 is movable along its longitudinal axis in the cylindrical casing 16. The plunger 24 may be actuated by any convenient means such as pneumatic pressure. The plunger 24 moves against the force of a pair of springs 26 and 28. When the motive force is removed from the plunger 24, the springs 26 and 28 resets the plunger 24.

A curved tube 30 has an outer end 32 that extends laterally from the plunger 24. The tube 30 has a 90° portion 34 arranged between the end 32 and a straight portion 36 that is centrally aligned in the casing 16. The solder 14 passes into the outer end 32 of the tube 30 which then guides the solder 14 into the casing 16.

Figure 2:
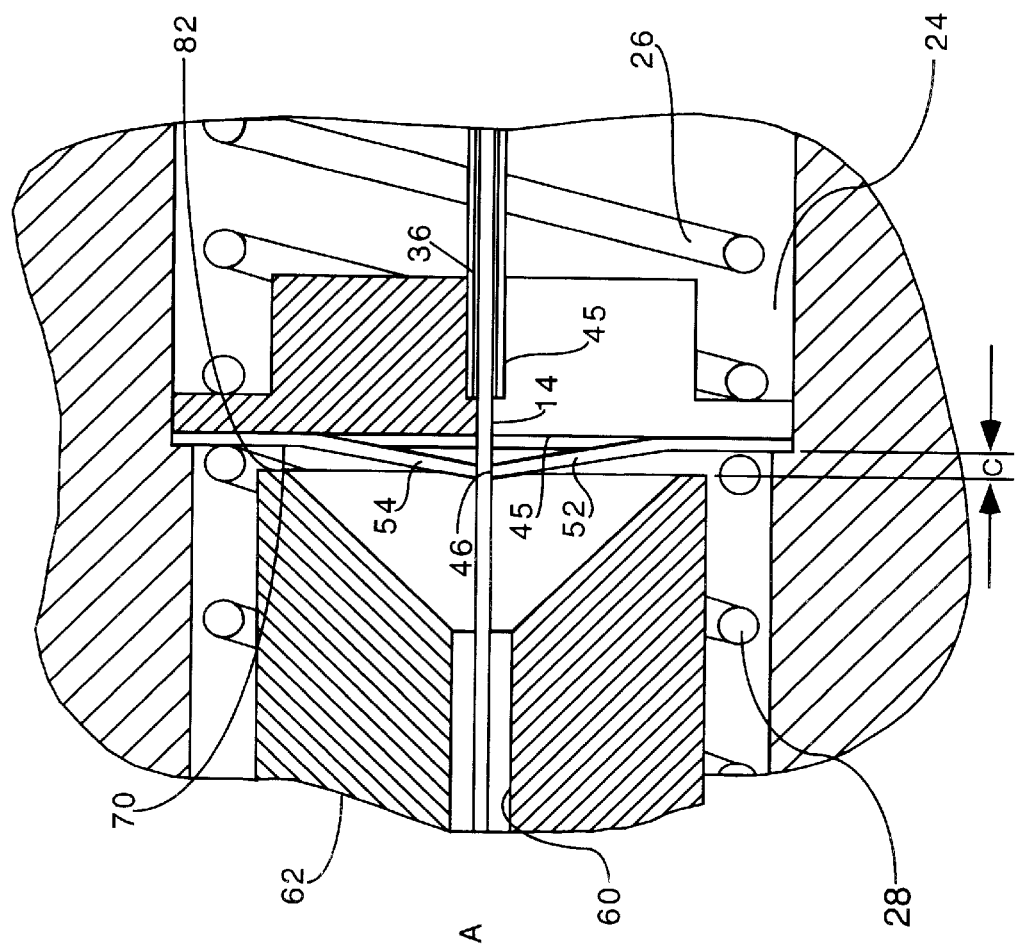
FIG. 2 is an expanded cross sectional view of a portion of the apparatus of FIG. 1 showing
Figure 3:
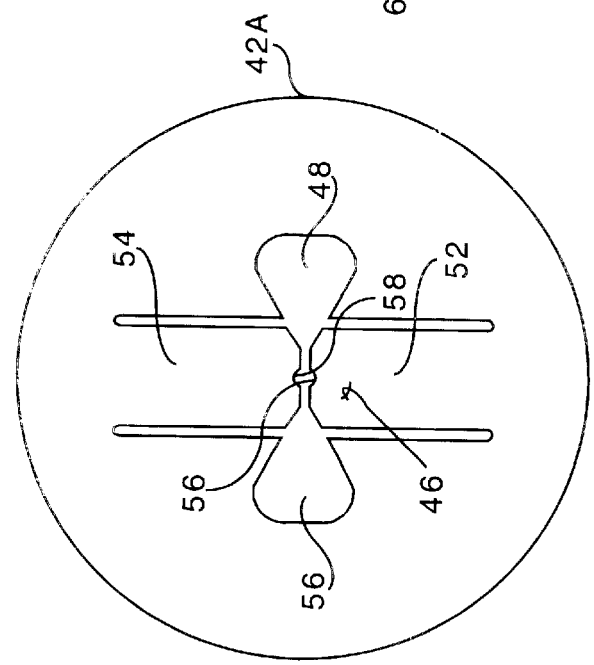
FIG. 3 is an elevation view of a spring included in the apparatus of FIGS. 1 and 2.

A first flat spring 42 is mounted to a first end 45 of the plunger The solder 14 exits the curved tube 30 at an inner end 44 and then passes through a passage 46 shown in FIG. 2 in the first flat spring 42. FIGS. 2 and 3 show details of the first flat spring 42. The spring 42 preferably has a generally circular perimeter 42A. Portions of the spring material are removed to make openings 48 and 50 that define a pair of leaf-like members 52 and 54 that face each other end-to-end. A pair of indentations 56 and 58 are formed in the facing ends of the leaf-like members 52 and 54, respectively. The indentations 56 and 58 are arranged to form the passage 46.

As best shown in FIG. 2 the leaf-like members 52 and 54 are not coplanar with the perimeter 42A. The first flat spring 42 is arranged to be mounted transverse to the axis of the casing 16. The leaf-like members 52 and 54 make oblique angles with the casing axis where the solder 14 is located. The solder 14 fits closely within the inner end 44 so that the edges of the indentations engage the solder 14. Any attempt to move the solder to the right as viewed in FIG. 1 is resisted by the leaf-like members 52 and 54 as their edges move into secure engagement with the solder 14. Therefore, the first flat spring 42 is arranged so that the solder 14 can travel in only one direction through the passage 44.

After passing through the spring 42, the solder passes through a central bore 60 formed in a piston 62 that is axially mounted in the casing 16. The piston 62 has an end 63 that is threadedly engaged with a nut 65 that is rotationally fixed within the plunger 24. The piston 62 and the spring 42 move with the plunger in the casing 16. A second flat spring 64 that preferably is substantially identical to the first flat spring 42 is mounted to an end 66 of the piston 62. The spring 64 permits the solder 14 to move only in the same direction as it can move through the spring 42.

The plunger 24 advances the first flat spring 42 and the solder 14 within the cylinder until the face 70 of the first flat spring 42 touches a stop at an end 82 of the piston 62. The amount of movement of the plunger 24 before the first flat spring reaches the stop defines the length "C" of the solder piece to be cut off. Spring 28 is softer than spring 26.

Figure 4:
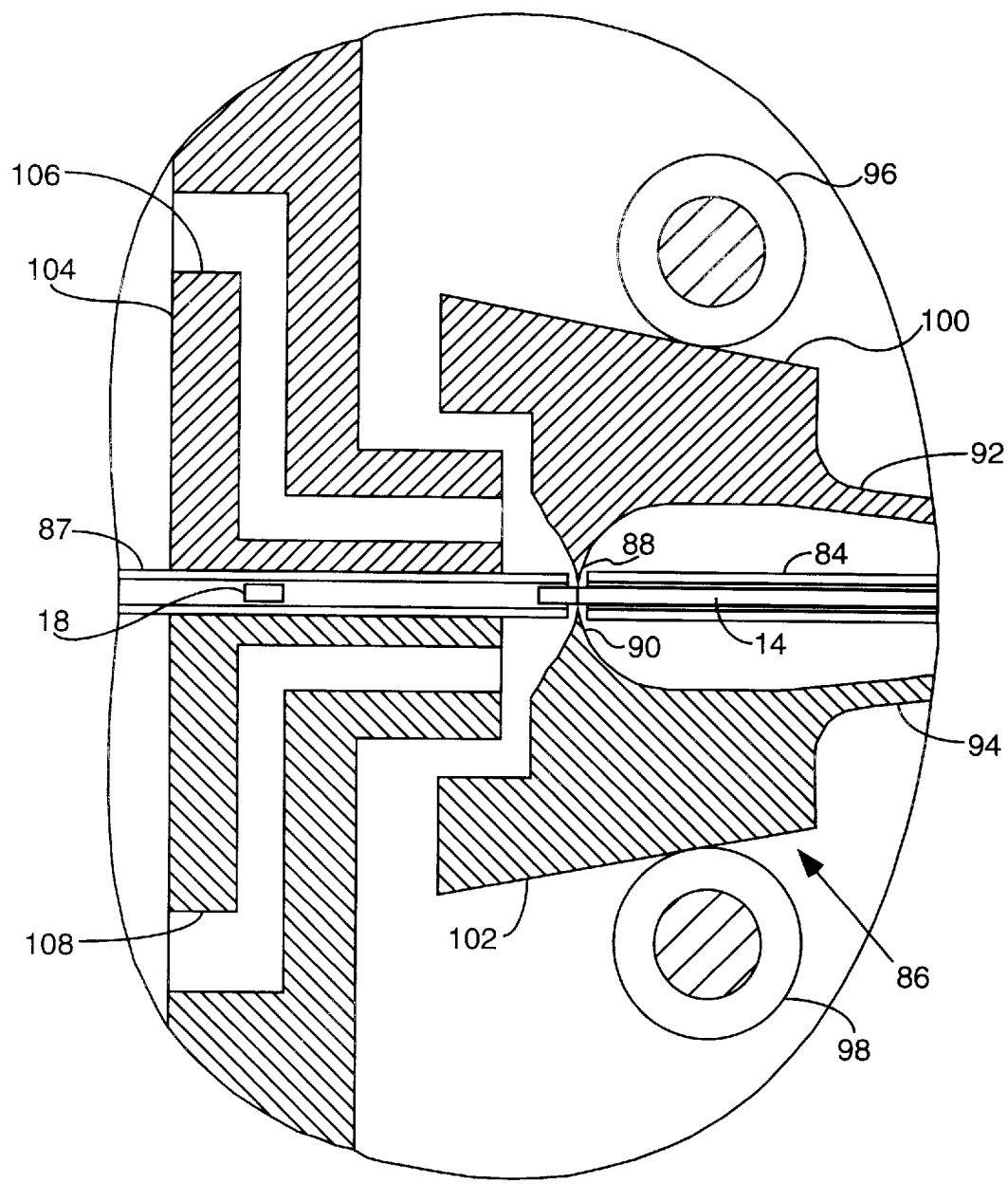
FIG. 4 is an expanded cross sectional view of a portion of FIG. 1 showing solder cutting apparatus and apparatus for ejecting a cut solder piece from the cutting apparatus.

Referring to FIGS. 1 and 4, after passing through the second flat spring 64, the solder 14 then passes into a second tube 84 which guides the solder 14 to a cutting mechanism 86 placed at the left end of the second tube 84. The solder end of length extends beyond the cutting mechanism 86 into a third tube 87. The cutting mechanism 86 preferably comprises a pair of cutting blades 88 and 90 mounted on the ends of corresponding leaf springs 92 and 94. As the plunger 24 advances to the left as shown in FIG. 1, it carries a pair of rollers 96 and 98 along the outer faces 100 and 102 of the leaf springs 92 and 94. Initially, the left end 95 of the plunger 24 is displaced a small distance from the rollers 96 and 98 so that the desired length of the solder 14 can be drawn from the spool 12 before the cutting action occurs. As the plunger 24 reaches its limit of movement, the rollers 96 and 98 urge the leaf springs 92 and 94 and corresponding cutting blades 88 and 90 together to cut the solder 14 so that the solder piece 18 of length C is cut off.

The cut off solder piece 18 is then free to move within the third tube 87. The casing 16 includes an end cap 104 having passages 106 and 108 therein arranged to guide compressed air to the region of the cutting blades 88 and 90. The compressed air exerts a force on the right end of the cut off solder piece 18. The solder piece is then forced away from the cutting mechanism to an outer end 110 of the third tube 87.

Figure 5:
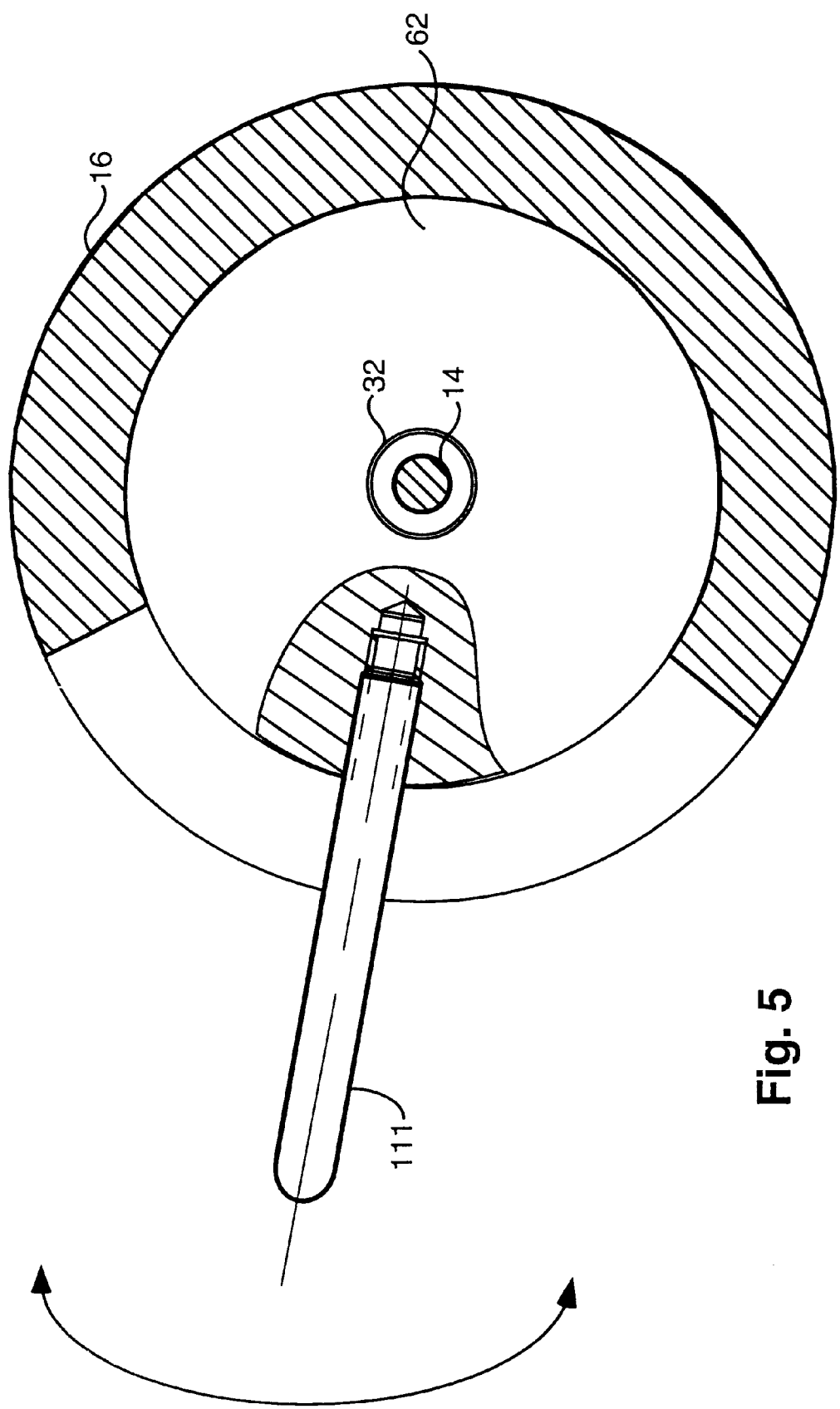
FIG. 5 is a partial cross sectional view taken along line 5—5 of FIG. 1.

FIG. 5 is a cross sectional view showing the tube 32 and the solder 14 centered in the casing 16. Referring to FIGS. 1 and 5, the length of the solder piece 18 to be cut off may be adjusted by means of a pin 111 that extends radially outward from the piston 62. The pin 111 is used to rotate the piston 62 relative to the nut 65, which moves the piston axially within the casing 16. The axial position of the piston in the casing 16 controls the range of movement of the plunger 24, which in turn controls the distance that the solder 14 moves before the cutter mechanism is actuated to cut off the solder piece 18.

Figure 6:
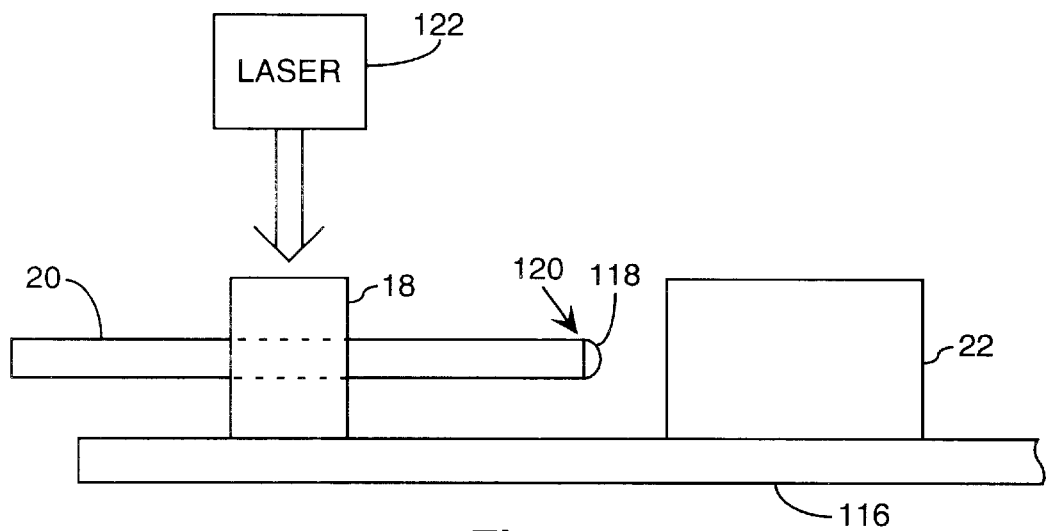
FIG. 6 is a side elevation view of a pigtailing station showing application of a length of solder being placed in contact with an optical fiber pigtail arranged for mounting to a substrate.

As shown in FIG. 6, an optical fiber 20 is a arranged to be in line with the optical output axis of the light source 22. The light source ordinarily is a laser diode 22 that is mounted on a substrate 116. The optical fiber 112 has a lens 118 at an end 120. The lens is arranged to focus light from the laser diode 22 into the optical fiber 112. To maintain the desired orientation between the optical fiber 112 and the laser diode 22, the optical fiber pigtail 112 is secured to the substrate 116.

Figure 7:
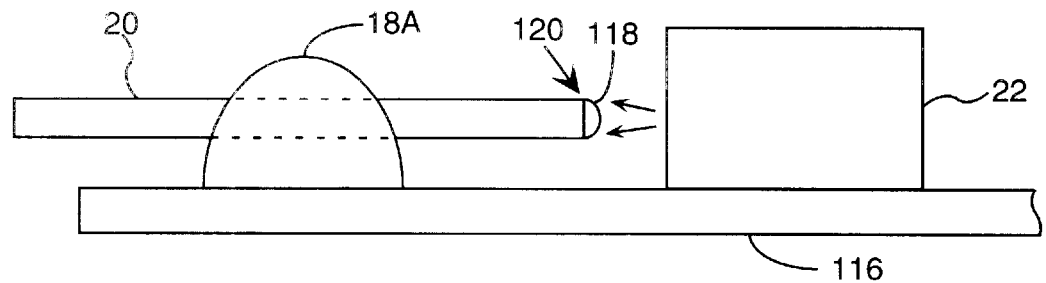
FIG. 7 is a side elevation view of the apparatus of FIG. 5 after the optical fiber pigtail has been soldered to the substrate.

The solder placement device according to the present invention places the cut off solder piece 18 adjacent the optical fiber pigtail 112 and the substrate 116 where a solder bond is to be formed between the optical fiber pigtail 112 and the substrate 116 for application to an optical fiber pigtail 112 to be soldered to the substrate 111. A laser 122 is arranged to provide energy to the solder piece 18 sufficient to melt it and form the desired solder bond between the optical fiber pigtail 112 and the substrate 116. FIG. 7 shows the optical fiber pigtail passing through a small drop of solder that has formed as a result of application of heat to the cut off solder piece 18.

An exemplary embodiment of the invention is disclosed herein to explain how to make and use the invention. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. Apparatus for forming a selected length of a wire and delivering it to a selected location, comprising:

a casing;

a plunger mounted to have a first end disposed in the casing, the plunger being arranged for reciprocal movement along an axis in the casing;

an input tube extending between a first location external to the casing and a second location inside the casing, the input tube being arranged to guide the wire to the second location;

a retainer mounted to the plunger adjacent the second location, the retainer being arranged to allow unidirectional movement of the wire along the axis;

a cutting mechanism mounted in the casing displaced along the axis from the retainer, the cutting mechanism being actuated by movement of the plunger along the axis to cut off a piece of wire of the selected length;

an output tube having a first end mounted to the casing adjacent the cutting mechanism and arranged to receive the cut off piece of wire and a second end arranged to be adjacent the selected location for delivering the cut off piece of wire thereto; and apparatus for moving the cut off piece of wire through the output tube to the selected location where the selected length of wire is delivered to a soldering station for bonding an optical fiber to a substrate.

2. The apparatus of claim 1 wherein the retainer comprises a leaf spring mounted to the plunger inside the casing, the leaf spring having a central passage arranged along the axis and having edges of the passage arranged to engage the wire to permit movement of the wire toward the cutting mechanism and to resist movement of the wire away from the cutting mechanism.

3. The apparatus of claim 2 further comprising a second retainer mounted in the casing between the first retainer and the cutting mechanism.

4. The apparatus of claim 2 wherein the apparatus for moving the cut off piece of wire through the output tube comprises a passage for delivering compressed air to the cutting mechanism to propel the cut of piece of wire through the output tube.

5. The apparatus of claim 2 wherein the cutting mechanism comprises:

a cutting blade disposed in the casing adjacent the wire, the cutting blade being mounted on a spring member that bias the cutting blade away from the wire; and cutter control apparatus actuated by axial movement of the plunger such that when the selected length of wire has been moved through the cutting mechanism, the cutting blade is moved through the wire to cut off the selected length.

6. The apparatus of claim 1 wherein the optical fiber is arranged to be optically coupled to a laser diode.

* * * * *